(12) United States Patent
Chen (10) Patent No.: US 11,253,742 B2
(45) Date of Patent: Feb. 22, 2022

(54) FRAME LIFTING MECHANISM FOR FITNESS EQUIPMENT

(71) Applicant: CHANG YOW TECHNOLOGIES INTERNATIONAL CO., LTD., Taichung (TW)

(72) Inventor: Chao-Chuan Chen, Taichung (TW)

(73) Assignee: CHANG YOW TECHNOLOGIES INTERNATIONAL CO., LTD., Taichung (TW)

( * ) Notice: Subject to any disclaimer, the term of this patent is extended or adjusted under 35 U.S.C. 154(b) by 265 days.

(21) Appl. No.: 16/738,461

(22) Filed: Jan. 9, 2020

(65) Prior Publication Data

US 2021/0162257 A1 Jun. 3, 2021

(30) Foreign Application Priority Data

Nov. 29, 2019 (TW) .................... 108143664

(51) Int. Cl.
*A63B 22/00* (2006.01)
*A63B 22/06* (2006.01)
*F16M 11/20* (2006.01)

(52) U.S. Cl.
CPC ...... *A63B 22/0046* (2013.01); *A63B 22/0017* (2015.10); *A63B 22/0605* (2013.01);
(Continued)

(58) Field of Classification Search
CPC ............ A63B 22/0015; A63B 22/0017; A63B 22/0023; A63B 22/0045; A63B 2225/09;
(Continued)

(56) References Cited

U.S. PATENT DOCUMENTS

| 1,725,216 A | * | 8/1929 | Seldomridge | ......... B66F 7/0691 |
| | | | | 254/126 |
| 2,793,767 A | * | 5/1957 | Smith | ....................... B66F 7/22 |
| | | | | 414/583 |

(Continued)

FOREIGN PATENT DOCUMENTS

| DE | 1245076 B | * | 7/1967 | .............. B66F 7/065 |
| DE | 2656668 A1 | * | 6/1978 | ........... A61G 7/1057 |
| DE | 10145476 A1 | * | 4/2002 | ................ B66F 7/08 |

*Primary Examiner* — Eret C McNichols
(74) *Attorney, Agent, or Firm* — Muncy, Geissler, Olds & Lowe, PC (57) ABSTRACT

A frame lifting mechanism includes a base, a motor, a lead screw, a sliding member, a lifting member and a supporting shaft. The motor is connected to the lead screw, and the lead screw is fastened onto a transmission tube, allowing the transmission tube to move forward and backward while being driven by the lead screw. The sliding member is installed on a sliding track arranged on the base and connected to the transmission tube, allowing the sliding base to actuate with the transmission tube synchronously. A rear end of the lifting base is pivotally attached onto the base for support, and the supporting member uses its two top and bottom ends to be pivotally attached onto the lifting member and the sliding member respectively, allowing the supporting shaft to utilize the movement of the sliding member to drive the lifting member to move upward and downward.

5 Claims, 7 Drawing Sheets

(52) U.S. Cl.
CPC ..... *A63B 2022/002* (2013.01); *A63B 2225/09* (2013.01); *F16M 11/2007* (2013.01); *F16M 11/2092* (2013.01)

(58) Field of Classification Search
CPC . F16M 11/2007; F16M 11/2092; B66F 7/065; B66F 7/0683; B66F 7/0691; B66F 7/22
See application file for complete search history.

(56) References Cited

U.S. PATENT DOCUMENTS

| | | | | |
|---|---|---|---|---|
| 3,902,616 | A * | 9/1975 | Santic | B66F 7/08 |
| | | | | 414/420 |
| 4,273,306 | A * | 6/1981 | Chang | A47B 9/16 |
| | | | | 108/145 |
| 4,718,355 | A * | 1/1988 | Houghton | A47B 9/16 |
| | | | | 108/147 |
| 5,257,428 | A * | 11/1993 | Carroll | A47C 19/122 |
| | | | | 5/201 |
| 5,503,368 | A * | 4/1996 | Torres | B66F 7/0608 |
| | | | | 254/122 |
| 5,749,807 | A * | 5/1998 | Webb | A63B 21/157 |
| | | | | 482/52 |
| 6,705,238 | B1 * | 3/2004 | Heckert | B66F 7/065 |
| | | | | 108/145 |
| 6,874,182 | B2 * | 4/2005 | L'Hegarat | A61G 13/08 |
| | | | | 5/612 |
| 6,951,037 | B2 * | 10/2005 | Weinman | A47C 20/041 |
| | | | | 5/200.1 |
| 7,849,539 | B2 * | 12/2010 | Hornbach | A61G 7/015 |
| | | | | 5/618 |
| 8,845,493 | B2 * | 9/2014 | Watterson | A63B 24/0087 |
| | | | | 482/4 |
| 9,352,185 | B2 * | 5/2016 | Hendrickson | F16H 25/2056 |
| 9,463,966 | B1 * | 10/2016 | Damabi | B66F 3/22 |
| 9,808,093 | B2 * | 11/2017 | Rawls-Meehan | A47C 20/04 |
| 10,561,877 | B2 * | 2/2020 | Workman | A63B 24/0087 |
| 10,912,391 | B2 * | 2/2021 | Wang | A61G 7/0508 |
| 10,926,676 | B2 * | 2/2021 | Dotzler | B60N 2/39 |
| 10,974,092 | B2 * | 4/2021 | Lagree | A63B 21/4035 |
| 2005/0096189 | A1 * | 5/2005 | Chen | A63B 22/0235 |
| | | | | 482/54 |
| 2005/0239607 | A1 * | 10/2005 | Chang | A63B 22/0023 |
| | | | | 482/54 |
| 2006/0169543 | A1 * | 8/2006 | Gonzi | B66F 7/065 |
| | | | | 187/269 |
| 2009/0124465 | A1 * | 5/2009 | Wang | A63B 22/02 |
| | | | | 482/54 |
| 2010/0325797 | A1 * | 12/2010 | Horne | B66F 7/0691 |
| | | | | 5/611 |
| 2012/0071301 | A1 * | 3/2012 | Kaylor | A63B 22/0605 |
| | | | | 482/57 |
| 2013/0206949 | A1 * | 8/2013 | Archambault | B60N 2/508 |
| | | | | 248/421 |
| 2013/0267386 | A1 * | 10/2013 | Her | A63B 22/02 |
| | | | | 482/54 |
| 2015/0057127 | A1 * | 2/2015 | Lagree | A63B 21/00 |
| | | | | 482/4 |
| 2015/0232005 | A1 * | 8/2015 | Haller | B60N 2/525 |
| | | | | 248/562 |
| 2016/0106607 | A1 * | 4/2016 | Lykkegaard | A61G 5/1059 |
| | | | | 248/421 |
| 2018/0072189 | A1 * | 3/2018 | Plante | B60N 2/162 |
| 2018/0200566 | A1 * | 7/2018 | Weston | A63B 22/0023 |
| 2018/0200568 | A1 * | 7/2018 | Li | A63B 22/0023 |
| 2019/0160329 | A1 * | 5/2019 | Lagree | A63B 21/153 |
| 2019/0240530 | A1 * | 8/2019 | Lagree | A63B 24/0087 |
| 2021/0080046 | A1 * | 3/2021 | Lorenz | F16M 11/42 |
| 2021/0139110 | A1 * | 5/2021 | McCartney | B63B 34/26 |
| 2021/0178222 | A1 * | 6/2021 | Lo | A63B 22/201 |

* cited by examiner

FRAME LIFTING MECHANISM FOR FITNESS EQUIPMENT

BACKGROUND OF THE INVENTION

1. Technical Field

The present invention relates to a fitness equipment, in particular, to a frame lifting mechanism for a fitness equipment.

2. Description of Related Art

Exercise bike is a common indoor fitness equipment, and it mainly allows a user to step the pedals with both legs in order to rotate the flywheel driven by the pedals through a transmission mechanism (such as a sprocket and a chain). In addition, a resistance wheel can be used in conjunction to provide the desired resistance in order to simulate the scenario of riding a bicycle uphill.

However, during the actual operation of the aforementioned conventional exercise bike, a user merely performs the same pedal stepping action repetitively at the same place such that the user cannot experience the sensation of inclination during the riding of actual bicycles uphill. Such drawback may cause user to feel boring during the operation process of a conventional exercise bike, which may also lead to the problem of reducing user's willingness to use such equipment. Despite that currently, there are some exercise bikes equipped with lifting motor device in order to use the lifting motor to provide the function of adjusting the angle of the bike frame, such method utilizing the design of a lifting motor consumes excessive power and cannot achieve the effect of energy saving.

BRIEF SUMMARY OF THE INVENTION

The primary objective of the present invention is to provide a frame lifting mechanism for a fitness equipment capable of effectively simulating the sensation of real bicycle riding while achieving the effects of energy consumption reduction and improvement of operation performance.

To achieve the foregoing primary objective, the present invention provides a frame lifting mechanism for a fitness equipment, comprising: a base, a driving unit and a lifting unit. The driving unit includes a speed reducer, a motor, a lead screw, a transmission tube, a sliding track and a sliding member. The speed reducer is installed on the base; the motor connected to the reducer; one end of the lead screw connected to the reducer. The transmission tube is fastened onto the lead screw and configured to be driven by the lead screw in order to move axially along the lead screw. The sliding track is installed on the base and extends axially along the lead screw. The sliding member is slidably installed on the sliding track and connected to one end of the transmission tube, thereby allowing the sliding member to be driven by the transmission shaft to move along the sliding track. The lifting unit includes a lifting member for assembly and securement onto a frame and a supporting shaft positioned underneath the lifting member. A rear end of the lifting member is pivotally attached onto the base. The supporting shaft includes a first oblique extension section and a second oblique extension section. A top end of the first extension section is pivotally attached onto a front end of the lifting member, and a bottom end of the first extension section is connected to a top end of the second oblique extension section. A bottom end of the second oblique extension section is pivotally attached onto the sliding member, thereby allowing the supporting shaft to drive the lifting member along with the frame secured onto the lifting member to be lifted upward or lowered downward via the forward and backward movement of the sliding member. Furthermore, an angle is formed between the first oblique extension section and the second extension section and facing toward the lifting member; wherein the angle is between 90~180 degree.

According to the above, it can be understood that the frame lifting mechanism of the present invention is able to adjust a lifting angle of the frame swiftly depending upon the actual needs. In addition, the special angle design of the supporting shaft is able to allow the motor to output a relatively small power to successfully drive the lifting member along with the frame to adjust the lifting angle, thereby achieving the effect of energy saving.

Preferably, the lifting member includes an opening slot penetrating through two top and bottom surfaces of the lifting member. The lifting member uses the opening slot to secure with the bottom end of a frame in order to allow the lifting member to drive the frame to adjust the lifting angle together.

Preferably, the lifting member is positioned in front of the motor and extends obliquely upward in a direction away from the motor. Accordingly, it is able to allow the lifting member to achieve the labor-saving effect during the adjustment of the lifting angle of the frame.

The base includes a receiving slot, and the receiving slot is configured to receive a portion of the speed reducer, the lead screw, the transmission tube, the sliding track, the sliding member and a portion of the second oblique extension section of the supporting shaft. Consequently, the outer appearance of the overall structure is able to achieve the effect of clean and neat appearance.

Regarding the detailed structure, technical features, assembly or method of use of the frame lifting mechanism for a fitness equipment of the present invention, please refer to the following accompanied drawings and description. However, a person with ordinary skill in the art in the technical field of the present invention shall understand that such detailed description and the specific embodiments disclosed in the present invention are provided to illustrate the present invention only such that they shall not be treated as limitation of the scope of the claim of the present invention.

DETAILED DESCRIPTION OF THE INVENTION

First, please note that in this specification, including embodiments and claims described hereafter, all directional terms used shall make references to the direction shown in the drawings. Secondly, for the embodiments and drawings described in the following content, identical component signs shall refer to the same or similar components or structural features thereof.

Figure 1:
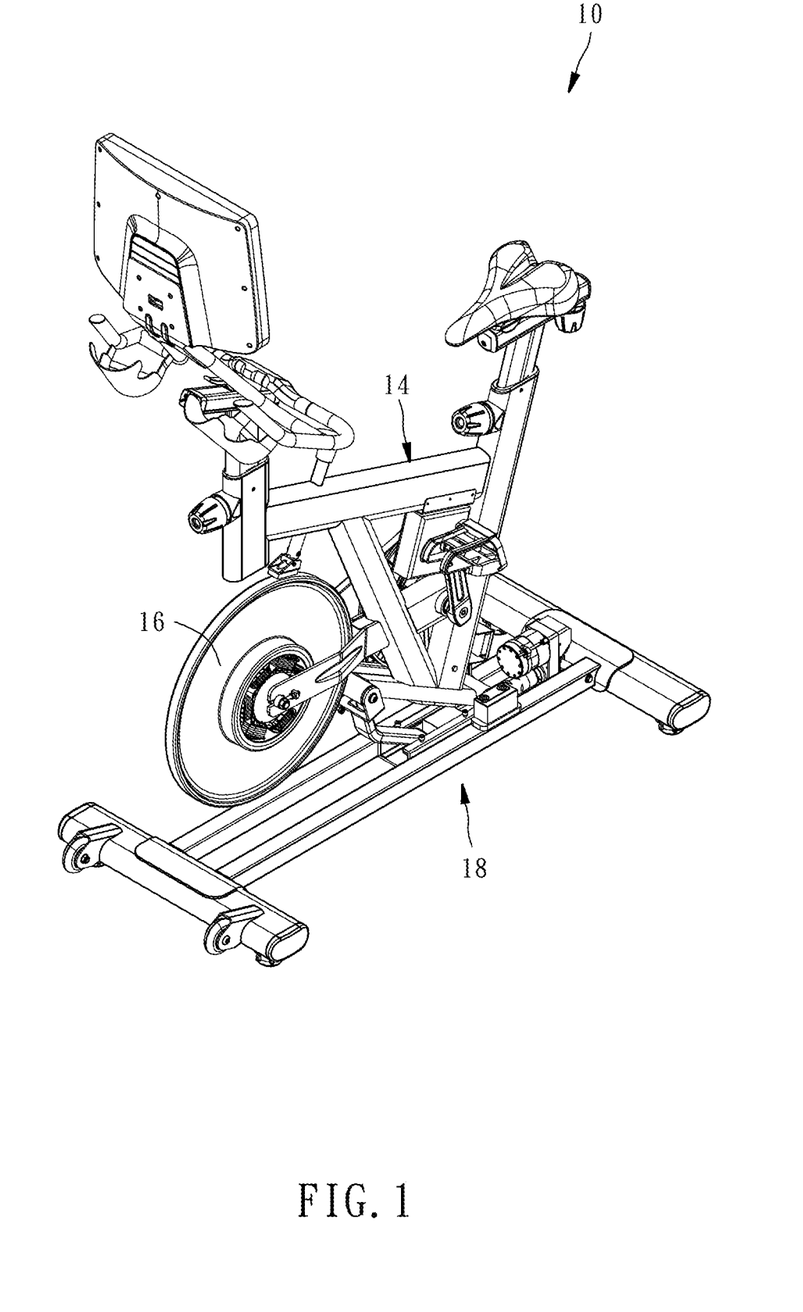
FIG. 1 is a perspective view of the frame lifting mechanism of the present invention used in conjunction with a fitness equipment.
Figure 2:
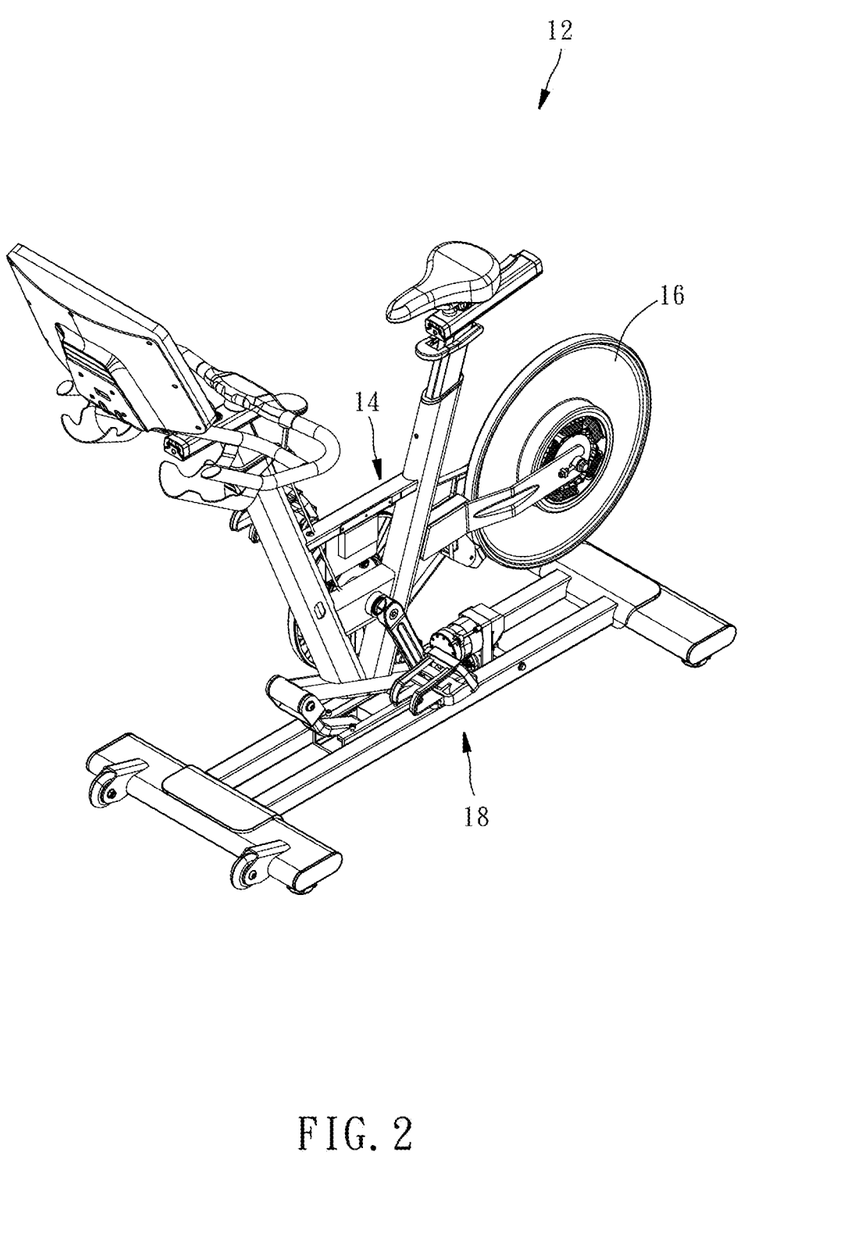
FIG. 2 is a perspective view of the frame lifting mechanism of the present invention used in conjunction with another fitness equipment.

Please refer to FIG. 1 and FIG. 2. For the exercise bikes 10, 12 shown in the aforementioned two drawings, their structural difference relies in the position of the resistance wheel 16. In FIG. 1, the resistance wheel 16 is installed at the front end of the frame 14; whereas in FIG. 2, the resistance wheel 16 is installed at the rear end of the frame 14. Since the detailed structure and operation principle of the aforementioned exercise bikes 10, 12 are known techniques and are not the key features of the present invention, details there are omitted hereafter for conciseness. Please continue to refer to FIG. 3. The frame lifting mechanism 18 of the present invention can be used in conjunction with two different types of exercise bikes 10, 12, and in terms of the structure, it comprises a base 20, a driving unit 30 and a lifting unit 40.

Figure 3:
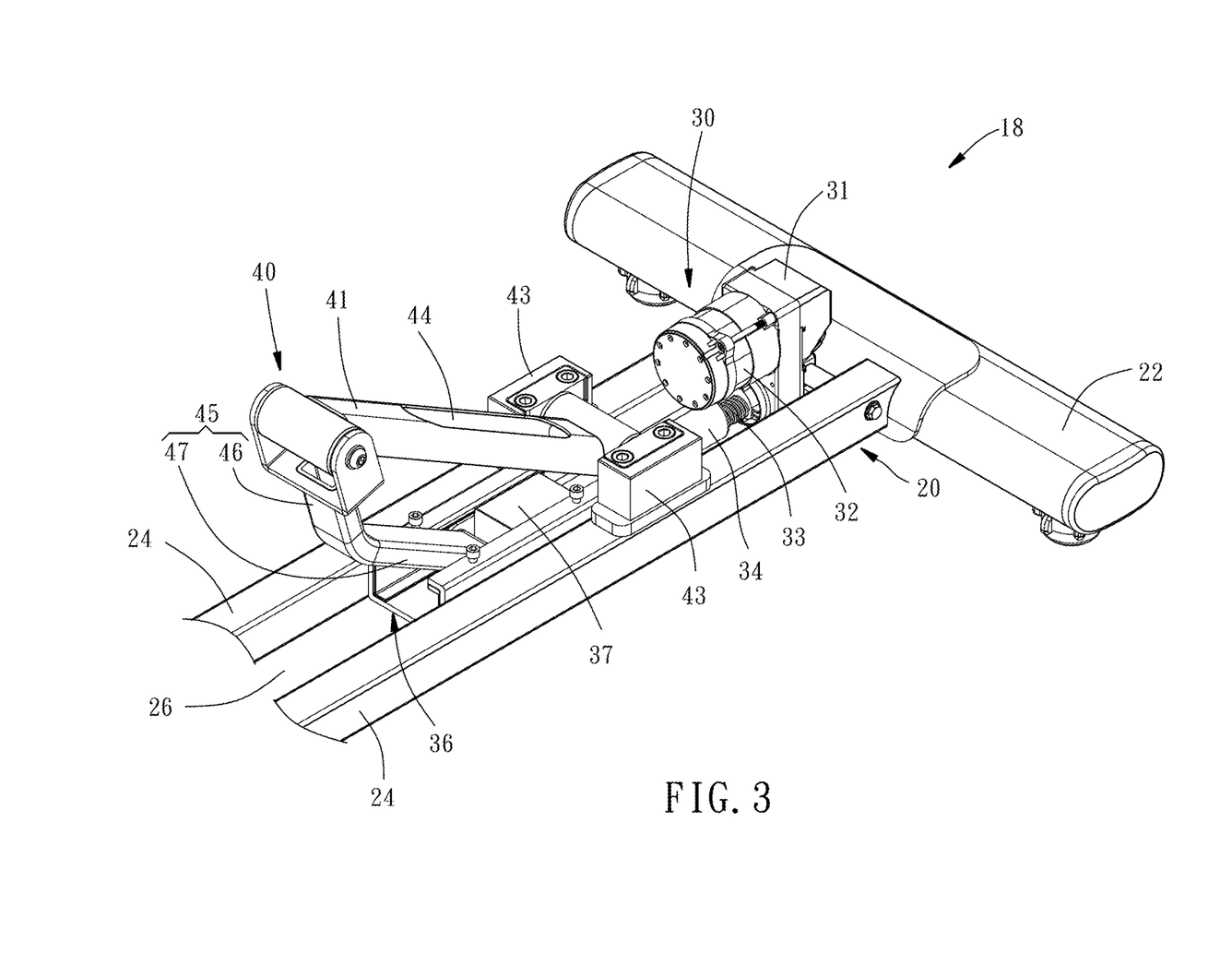
FIG. 3 is a perspective view of the frame lifting mechanism of the present invention.

The base 20 includes two front and rear cross bars 22 parallel to each other and two left and right base bars 24 parallel to each other. The two base bars 24 are connected between the two cross bars 22, and a receiving slot 26 is formed between the two base bars 24.

The driving unit 30 includes a speed reducer 31, a motor 32, a lead screw 33, a transmission tube 34, a sliding track 36 and a sliding member 37. The speed reducer 31 is partially received inside the receiving slot 26 and uses a fixation element, such as bolt and nut, for fastening ono the rear end of the two base bars 24 of the base 20. The motor 32 is positioned at the front end of the speed reducer 31 and uses its own driving axle (not shown in the drawings) to connect with the speed reducer 31. The lead screw 33 is arranged inside the receiving slot 26, and a rear end of the lead screw 33 is connected to the speed reducer 31, allowing motor 32 to drive the lead screw 33 to rotate in position via the speed reducer 31. The transmission tube 34 is arranged inside the receiving slot 26, and a rear end of the transmission tube 34 includes a nut 35 embedded therein. The transmission tube 34 uses the nut 35 for fastening onto the lead screw 33 in order to allow the transmission tube 34 to move forward and backward axially along with the lead screw 33 while being driven by the lead screw 33. The sliding track 36 is arranged inside the receiving slot 26 and uses a fixation element, such as screw, for installing onto the two base bars 24. The sliding track 36 is positioned at the front end of the transmission tube 34 and extends axially along the lead screw 33. The sliding member 37 is installed on the sliding track 36 and uses a fixation element, such as screw, for installing onto the front end of the transmission tube 34, thereby allowing the sliding member 37 to move forward and backward along the sliding track 36 while being driven by the transmission tube 34.

The lifting unit 40 includes a lifting member 41 and a supporting shaft 45. The lifting member 41 is positioned in front of the motor 32 and extends obliquely upward in a direction away from the motor 32. The rear end of the lifting member 41 is pivotally attached onto a pivotal axle 42. The two left and right ends of the pivotal axle 42 penetrate through a pivotal axle seat 43 respectively. The two pivotal axle seats 43 are secured onto the top surface of the two base bars 24. In addition, the lifting member 41 includes an opening slot 44 penetrating through the two top and bottom surfaces thereof. The opening slot 44 is configured to allow the bottom end of the frame 14 to be inserted therein, and the two are further secured onto each other via the welding method in order to allow the lifting member 41 to actuate synchronously with the frame 14. The supporting shaft 45 is positioned underneath the lifting member 41. The supporting shaft 45 includes a first oblique extension section 46 and a second oblique extension section 47 connected to the first oblique extension section 46. An angle θ, facing toward the lifting member 41, is formed between the first oblique extension section 46 and the second oblique extension section 47, and the angle θ is between 90~180 degree. In one aspect, the supporting shaft 45 uses the top end of the first oblique extension section 46 to be pivotally attached onto the front end of the lifting member 41, and in another aspect, it uses the bottom end of the second oblique section 47 to be pivotally attached onto the front end of the sliding member 37, thereby allowing the supporting shaft 45 to move along with the forward and backward movement of the sliding member 37 in order to drive the lifting member 41 to pivot upward and downward with the pivotal axle 42 as the axle center.

Figure 4:
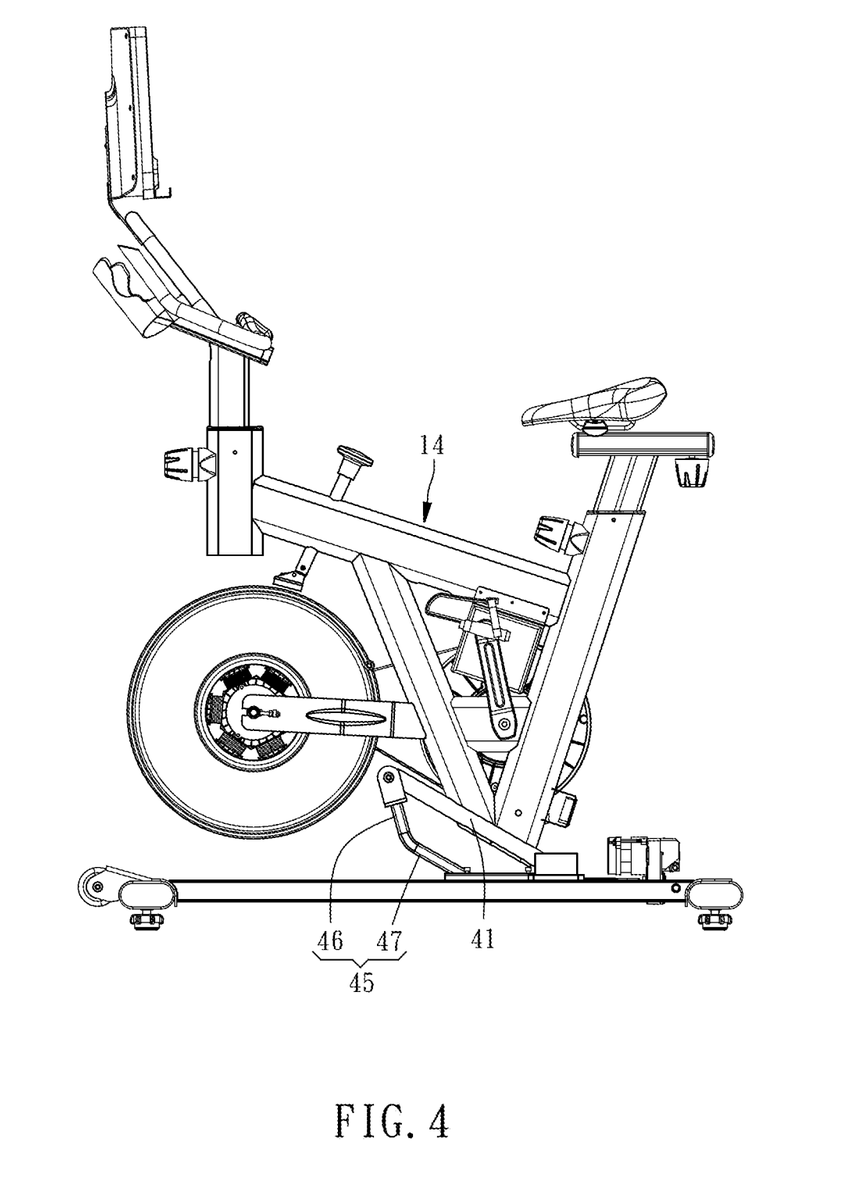
FIG. 4 is a plane view of the frame lifting mechanism of the present invention used in conjunction with a fitness equipment, mainly illustrating the state where the frame is not yet lifted.
Figure 5:
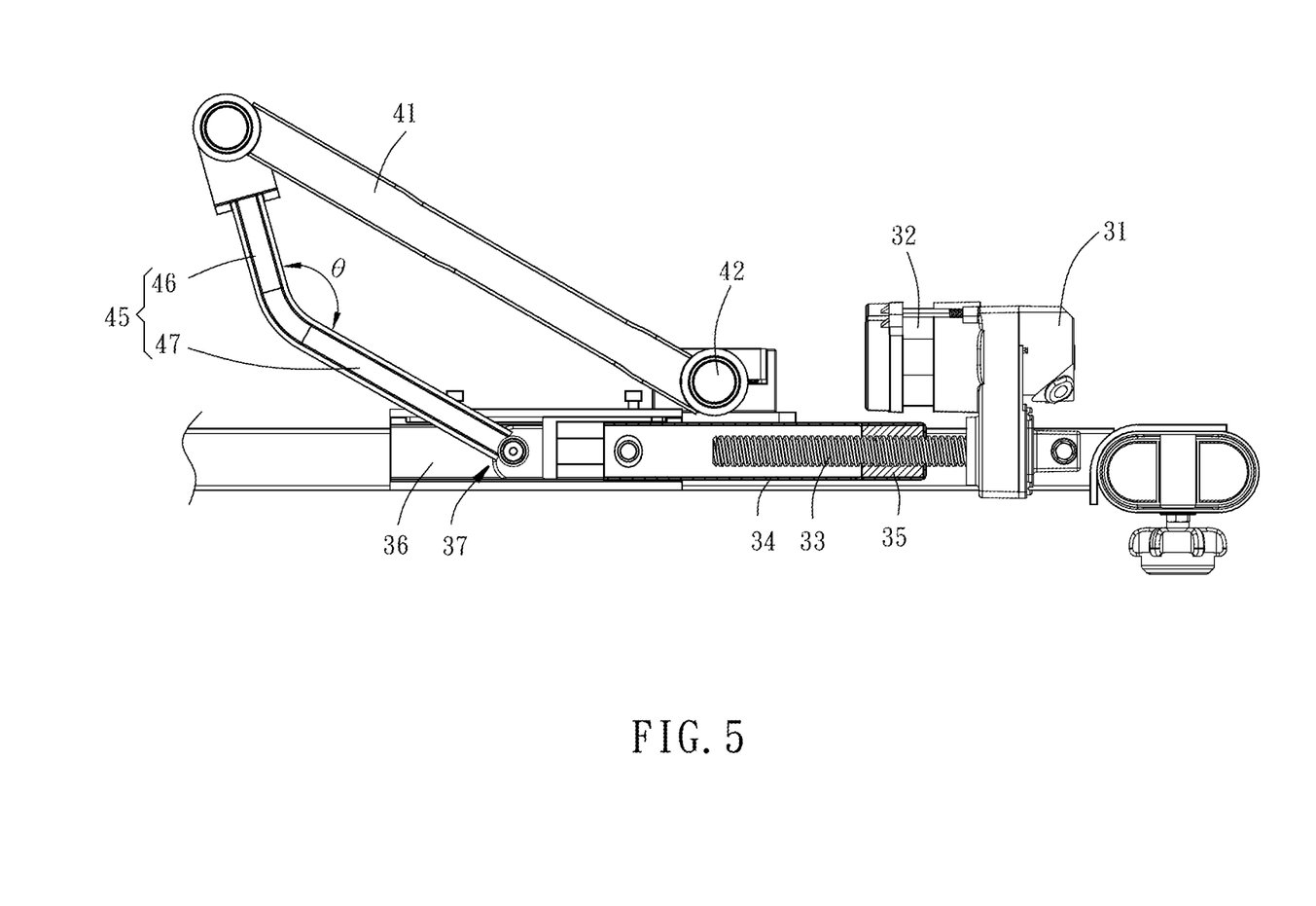
FIG. 5 is cross sectional view of the frame lifting mechanism of the present invention.
Figure 6:
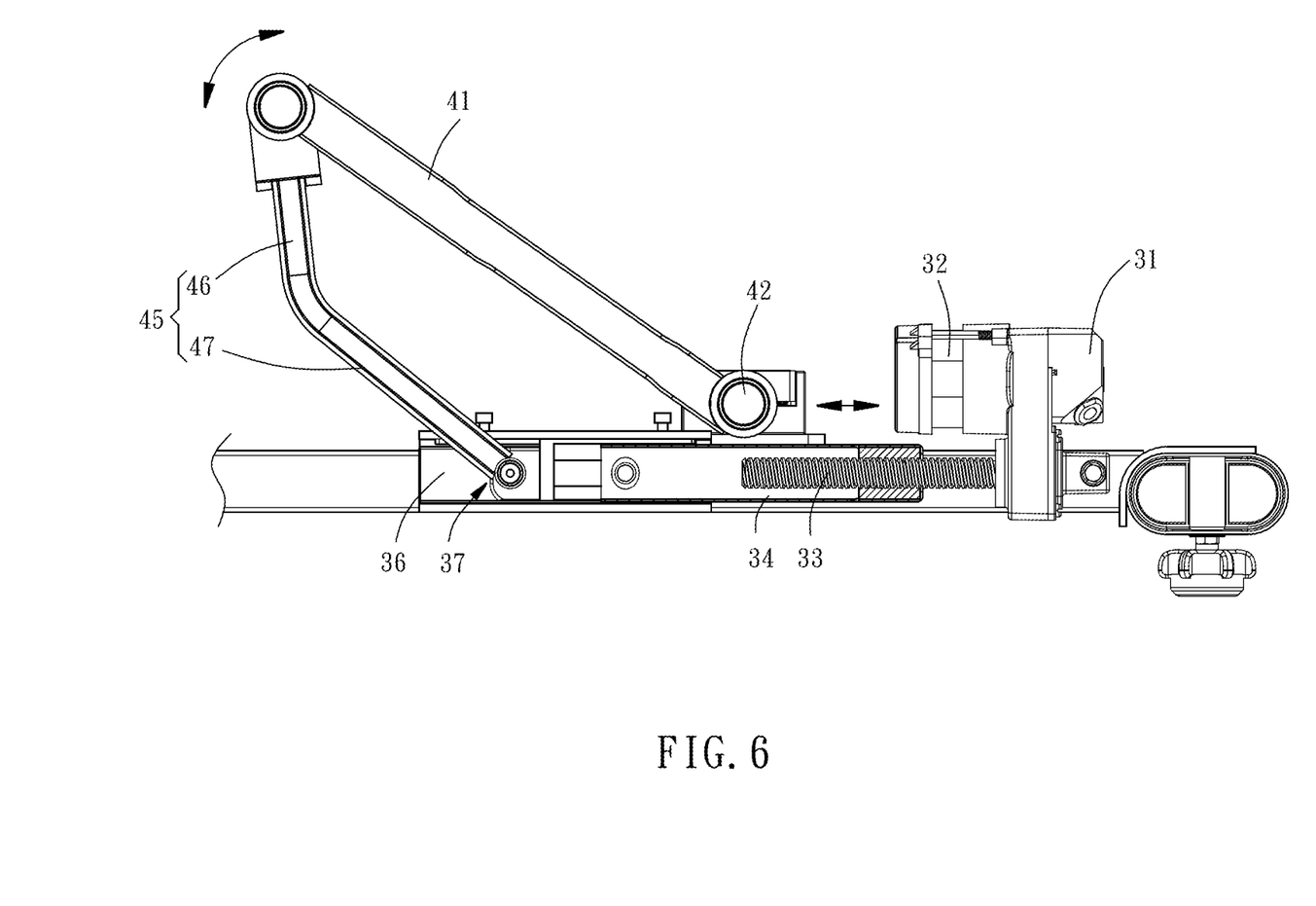
FIG. 6 is similar to FIG. 5, mainly illustrating the state after the lifting member is lifted upward.
Figure 7:
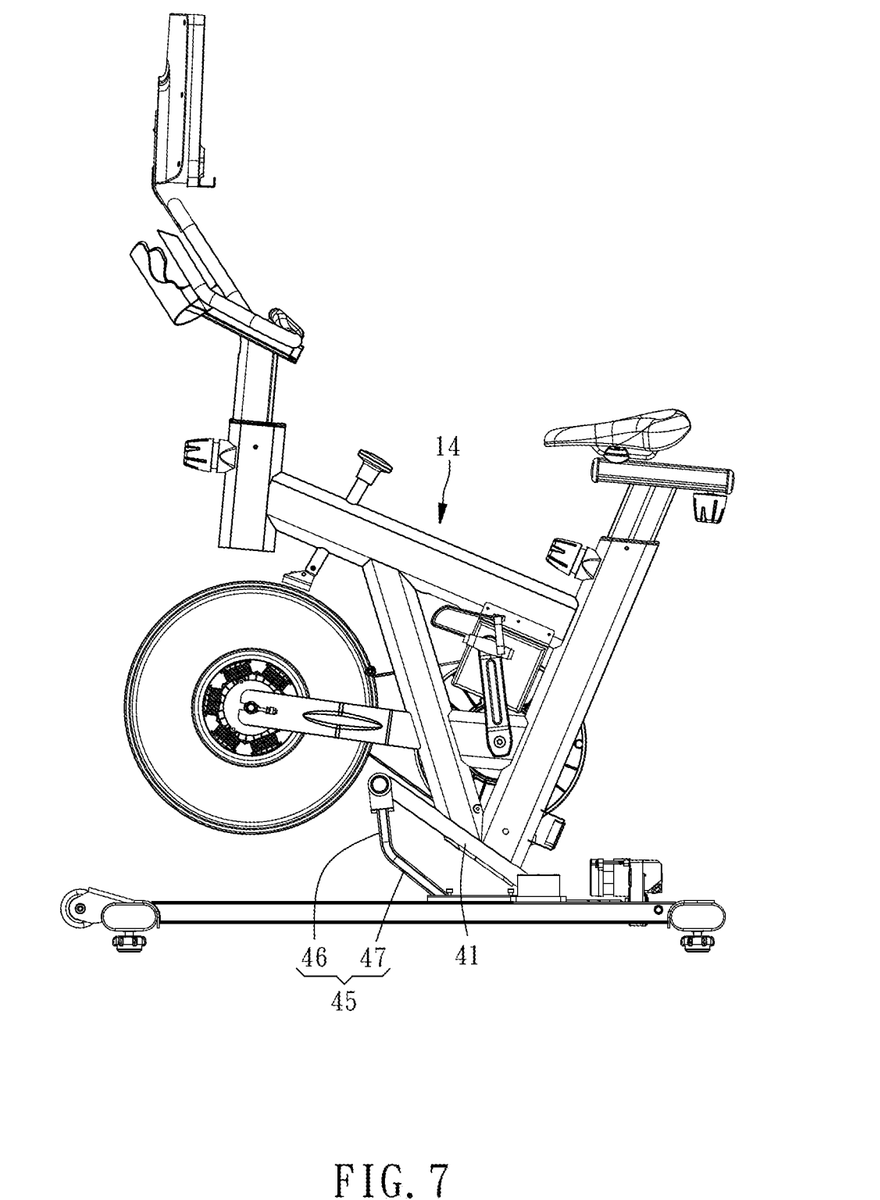
FIG. 7 is similar to FIG. 3, mainly illustrating the state after the frame is lifted upward.

During actual operation, as shown in FIG. 5 and FIG. 6, the motor 32 is turned on first, and the motor 32 is able to drive the lead screw 33 to rotate in position via the speed reducer 31. Next, the lead screw 33 drives the transmission tube 34 to move forward and backward (forward and backward movements are exemplarily illustrated in FIG. 6). During the process of the forward and backward movement of the transmission tube 34, the sliding member 37 is driven to move forward and backward along with the sliding track 36 synchronously, thereby allowing the supporting shaft 45 to further drive the lifting member 41. Accordingly, as shown in FIG. 4 and FIG. 7, the lifting member 41 along with the frame 14 is able to pivot upward and downward with the pivotal axle 42 as the axle center; consequently, the effect of adjusting the lifting angle of the frame 14 can be achieved.

In view of the above, the frame lifting mechanism 18 of the present invention is able to adjust the lifting angle of the frame 14 swiftly according to the actual needs. In addition, with the special angle design of the supporting shaft 45, the motor 32 is not required to output large power in order to complete the lifting angle adjustment of the frame 14 successfully. Consequently, it is able to reduce energy consumption and improve the operation performance, thereby achieving the effect of energy saving.

What is claimed is:

1. A frame lifting mechanism for a fitness equipment, comprising:
    a base;
    a driving unit having a speed reducer, a motor, a lead screw, a transmission tube, a sliding track and a sliding member; the speed reducer installed on the base; the motor connected to the reducer; one end of the lead screw connected to the reducer; the transmission tube fastened onto the lead screw and configured to be driven by the lead screw in order to move axially along the lead screw; the sliding track installed on the base and extending axially along the lead screw; the sliding member slidably installed on the sliding track and connected to one end of the transmission tube, thereby allowing the sliding member to be driven by the transmission shaft to move along the sliding track; and a lifting unit having a lifting member and a supporting shaft positioned underneath the lifting member; a rear end of the lifting member pivotally attached onto the base; the supporting shaft having a first oblique extension section and a second oblique extension section; a top end of the first extension section pivotally attached onto a front end of the lifting member, and a bottom end of the first extension section connected to a top end of the second oblique extension section; a bottom end of the second oblique extension section pivotally attached onto the sliding member; an angle formed between the first oblique extension section and the second extension section and facing toward the lifting member; wherein the angle is between 90~180 degree.

2. The frame lifting mechanism for a fitness equipment according to claim 1, wherein the lifting member includes an opening slot penetrating through two top and bottom surfaces of the lifting member; the opening slot is configured to secure a bottom end of a frame.

3. The frame lifting mechanism for a fitness equipment according to claim 1, wherein the lifting member is positioned in front of the motor and extends obliquely upward in a direction away from the motor.

4. The frame lifting mechanism for a fitness equipment according to claim 1, wherein the base includes a receiving slot; the receiving slot is configured to receive a portion of the speed reducer, the lead screw, the transmission tube, the sliding track, the sliding member and a portion of the second oblique extension section of the supporting shaft.

5. The frame lifting mechanism for a fitness equipment according to claim 1, wherein the transmission tube includes a nut embedded therein and configured to fasten onto the lead screw.

* * * * *